(12) United States Patent
Schlang et al.

(10) Patent No.: US 6,745,169 B1
(45) Date of Patent: Jun. 1, 2004

(54) LEARNING PROCESS FOR A NEURAL NETWORK

(75) Inventors: Martin Schlang, Munich (DE); Frank-Oliver Malisch, Neubiberg (DE); Einar Broese, Erlangen (DE); Otto Gramckow, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 10 days.

(21) Appl. No.: 08/686,792

(22) Filed: Jul. 26, 1996

(30) Foreign Application Priority Data

| Jul. 27, 1995 | (DE) | ......................................... 195 27 521 |
| Jun. 18, 1996 | (DE) | ......................................... 196 24 301 |

(51) Int. Cl.$^7$ ............................................. G06F 15/18
(52) U.S. Cl. ........................................... 706/16; 706/25
(58) Field of Search ............................. 395/21, 23, 24; 706/16, 25

(56) References Cited

U.S. PATENT DOCUMENTS

| 5,033,006 A | * | 7/1991 | Ishizuka | ....................... 395/23 |
| 5,175,678 A | * | 12/1992 | Frerichs | ....................... 364/148 |
| 5,353,207 A | * | 10/1994 | Keeler | ....................... 395/23 |
| 5,408,586 A | * | 4/1995 | Skeirik | ....................... 395/23 |
| 5,479,573 A | * | 12/1995 | Keeler | ....................... 395/23 |
| 5,486,996 A | * | 1/1996 | Samad | ....................... 395/21 |
| 5,513,097 A | * | 4/1996 | Gramckow | ....................... 395/903 |
| 5,566,275 A | * | 10/1996 | Kano | ....................... 395/23 |
| 5,600,758 A | * | 2/1997 | Broese | ....................... 395/21 |
| 5,608,842 A | * | 3/1997 | Broese | ....................... 395/21 |
| 5,625,552 A | * | 4/1997 | Mathur | ....................... 395/903 |

FOREIGN PATENT DOCUMENTS

| DE | 44 16 364 | 11/1994 |

OTHER PUBLICATIONS

Wang, "A self growing learning algorithm for determining the appropriate number of hidden units," 1991 Intl conf on neural networks (IEEE), Nov. 1991.*

Hirose, "Back propagation algorithm which varies the number of hidden units," Neural Networks v4 n1, Dec. 1991.*

Mozer, "Skeletonization: a technique for trimming the fat from a network via relevance assessment," University of colorado department of computer science & institute of cognitive science, p107, Dec. 1991.*

* cited by examiner

Primary Examiner—George B. Davis
(74) Attorney, Agent, or Firm—Kenyon & Kenyon

(57) ABSTRACT

A learning process for a neural network for open-loop or closed-loop control of an industrial process with time-variable parameters. The neural network is configured either as an open-loop or closed-loop-control network with which the process is controlled. The neural network is trained with the current process data so that it builds a model of the current process. The neural network can also be configured as a background network which is trained during operation with representative process data so that it builds an averaged model of the process over a longer period of time. After a certain learning time or upon the occurrence of an external event, the open-loop or closed-control network is replaced by the background network.

13 Claims, 2 Drawing Sheets

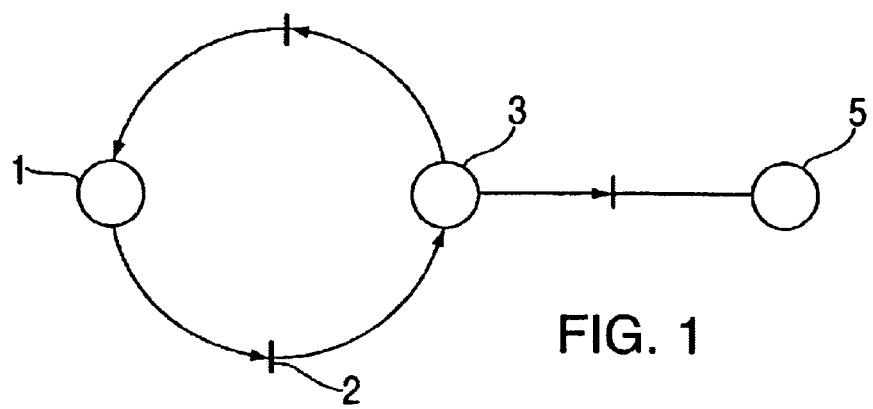
FIG. 1
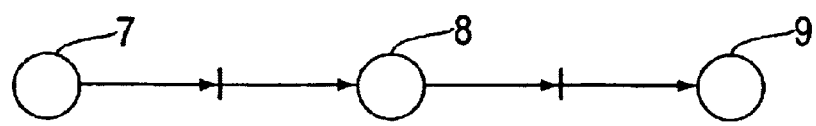
FIG. 2
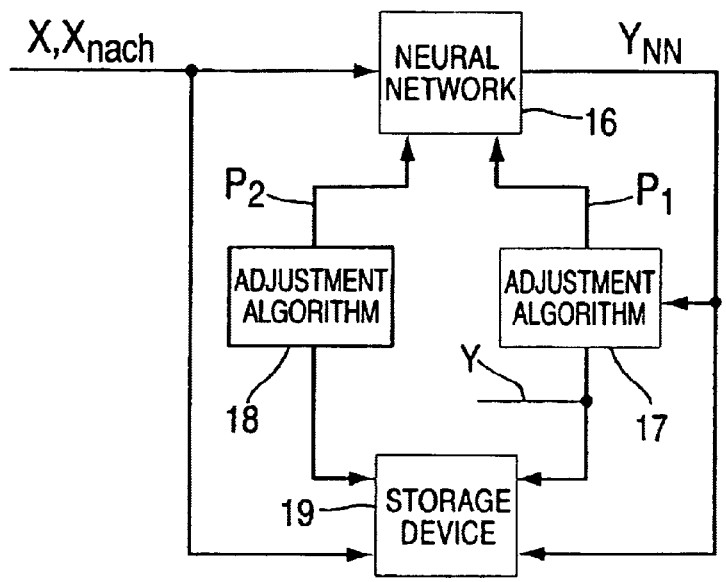
FIG. 7
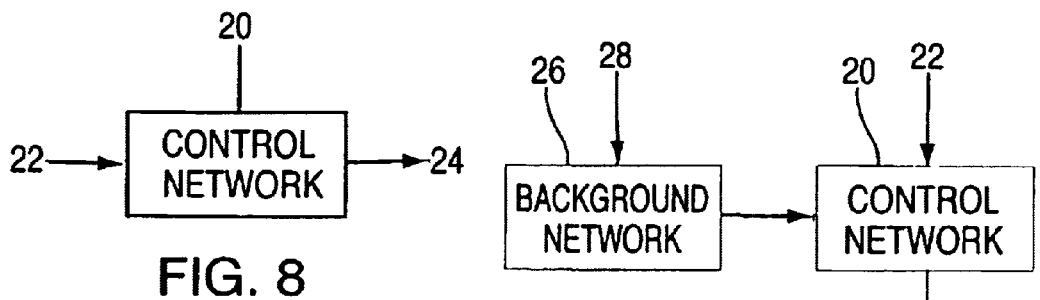
FIG. 8
FIG. 9

LEARNING PROCESS FOR A NEURAL NETWORK

FIELD OF THE INVENTION

The present invention relates to a learning procedure for a neural network for open-loop or closed-loop control of a process with time-variable parameters.

BACKGROUND INFORMATION

Neural networks must be first trained with learning or training data before they become capable of generalizing. Acquiring the training data is often time-consuming and expensive.

An example is the neural network described in German Patent Application No. 44 16 364, which calculates a process parameter from a multiplicity of previously calculated input parameters supplied to it, which serves to preset a system controlling an industrial process. Thus, for example, in a rolling process, a predictive value for the rolling force is calculated as a function of the rolled stock temperature, thickness reduction, and other material-specific and system-specific input parameters. The relationship between the rolling force and the input parameters, simulated by the neural network, is adjusted on-line after each process run, i.e., after each pass of the rolled stock, to the actual process events. For this purpose, the input parameters measured during the process run and subsequently recalculated, and the rolling force are combined at a data point, which is then used for the adjustment of the neural network parameters. The adjustment is done with each new data point, i.e., on-line. The adjustment must be characterized by special stability, since it is often carried out directly and without supervision by a person skilled in the art on the system executing the process. Therefore, only non-critical parameters of the neural network are adjusted in on-line training, using adjustment algorithms and network structures, thus ensuring stability for the procedure; i.e., minimization of the square of the error function between the network response and the recalculated rolling force, with the error function preferably having only one global minimum, and no local minima.

In order for a conventional neural network to predict, at least approximately, reasonable rolling forces from the beginning of the on-line training, the neural network can be pre-trained using a rolling force model that predicts the rolling force as a function of randomly preselected input parameters. If such a model is not available, the preliminary knowledge required for pre-training can be acquired by collecting training data, for example, on comparable systems and inputting them into the neural network.

An object of the present invention is to provide an open-loop or close-loop control for a process with time-variable parameters to ensure high quality. It is desirable, especially in the case of starting up a new system or after radical changes in an existing system which is controlled using neural networks, to enable the neural network to exhibit reasonable behavior, after just a few data points, directly within the system without pre-training. The same is true when an existing system is remodeled and data cannot be collected beforehand. Furthermore, long-term system drifts must be recognized and compensated for.

SUMMARY OF THE INVENTION

This object is achieved according to the present invention by a learning process for a neural network for open-loop or closed-loop control of a (mainly industrial) process with time-variable parameters with the neural network being configured in at least two embodiments. The first embodiment uses an open-loop or closed-loop control network with which the process is controlled and which is trained with the current process data so that it builds a model of the current process. The second embodiment uses a background network, which is trained during the operation with representative process data so that it builds an averaged model of the process over a longer period of time, with the open-loop or closed-loop control network-being replaced, after a-certain learning time on the part of the background network or on the basis of an external event by the background network.

Another embodiment of the present invention includes a learning process in which the learning during the process run is subdivided into two phases: an initial phase and an operating learning procedure. The amount of training data with which the neural network is trained grows in the initial phase and remains basically constant during the operating phase.

BRIEF DESCRIPTION OF THE DRAWINGS

FIG. 1 shows a training procedure for a neural network according to the present invention.

FIG. 2 shows additional learning phases of a neural network.

FIG. 7 shows an adaptively adjusted neural network according to the present invention.

FIG. 8 shows a neural network in accordance with an example embodiment of the present invention.

FIG. 9 shows another neural network in accordance with an example embodiment of the present invention.

DETAILED DESCRIPTION OF THE INVENTION

Figure 3:
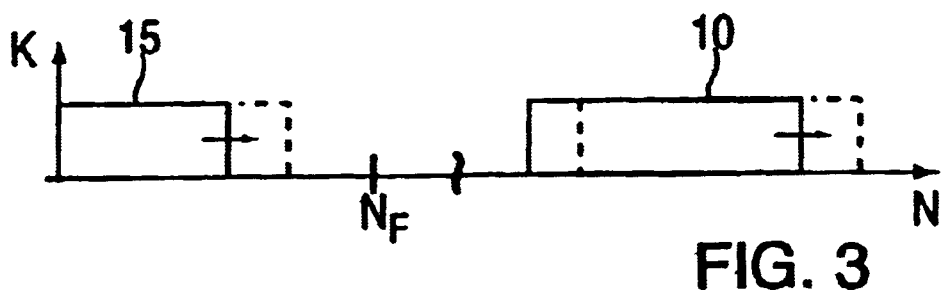
FIG. 3 shows a first graph of the amount of training data used in the cyclically repeated adjustment according to the present invention.

FIG. 1 shows the training procedure of a neural network for open-loop and closed-loop control of a process or-a system. The neural network is configured in at least two embodiments. FIG. 8 shows a first embodiment which includes an open-loop or closed-loop control network 20 with which the process is controlled and which is trained with the current process data 22 so that it builds a model of the current process and outputs at least one of the process parameters 24 used in the industrial process. FIG. 9 shows a second embodiment which includes a background network 26 which is trained during the operation with representative process data 28 so that it builds an averaged model of the process over a longer period of time. The open or closed-loop control network is in a state 5, in which it controls the process. At the same time, the background network is in training 1. At the time of end 2 of training 1 of the background network, the network is subjected to a plausibility check 3. If the plausibility check 3 results are positive, the open-loop or closed-loop control network is replaced with the plausible background network. While the old background network controls the process as the new open-loop or closed-loop control network, a new background network is produced by training 1. The training of a background network can take place on a permanent or occasional basis whenever a new open-loop or closed-loop control network is needed. The elapse of a certain time period or the occurrence of an external event, such as the rolling of a rolled sheet made of a new material, can trigger a new background training. The new background network may be based on an untrained raw network, an open-loop or closed-loop control network, or an old background network.

FIG. 2 shows three different training phases with reference to the learning process according to the present invention for a neural network. The individual phases are a pre-operation training phase 7, an initial learning phase 8, and an operating learning phase 9. In the pre-operation training phase, the neural network to be used for the open- or closed-loop control of an (advantageously) industrial process is pre-trained. In pre-operation training phase 7, it is possible to take into consideration the experience acquired in other systems already in operation through data collected from these systems. The pre-operation training phase 7 can, however, be omitted in the learning process according to the present invention. In that case, the know-how accumulated through data acquisition on the current system is sufficient to train the neural network. Two further learning phases follow the pre-operation training phase: initial learning phase 8 and operating learning phase 9, which take place during the process run. If the pre-operation training phase 7 is omitted, only the initial learning phase 8 and operating learning phase 9 remain. Initial learning phase 8 is characterized in that the training data database grows, while the amount of data for training the neural network in operating learning phase 9 remains basically constant. In this embodiment of the present invention, not only the database used for training grows in initial learning phase 8, but also the neural network is trained. Thus, the number of nodes in the hidden layer(s) increases.

These two distinct learning phases during operation, the initial and operating learning phases, are illustrated in FIG. 3, where the number of the data points used for the cyclic training of neural network 1 are plotted against the contribution of these points to the training. During initial training phase 7, cyclically repeated training takes place with a constantly growing amount of training data 15, with all the data stored from the beginning of the learning procedure being used every time. The frequency of the cyclically repeated training is a parameter to be optimized for the given application; for example, a new adjustment takes place after each new data point is introduced, after a predefined percentage growth in the amount of training data, or when the difference between the initial neural network parameters and their correct values exceeds a certain value. In addition, the size of the neural network can change as a function of the amount of available training data, starting with a small neural network, which slowly grows over time. The network size is established,-for example, using-the "cross-validation" method or other heuristic methods such as residual error in the input area.

After a predefined period of time or when the amount of training data reaches a predefined value $N_F$, the operating learning phase 9 begins, during which the amount of training data 10 is held constant. The amount $N_F$ may be static or determined dynamically using, for example, cross-validation techniques. The frequency of the cyclic adjustments and the size of neural network 1 is either constant or is determined as in the initial learning phase 8.

Figure 4:
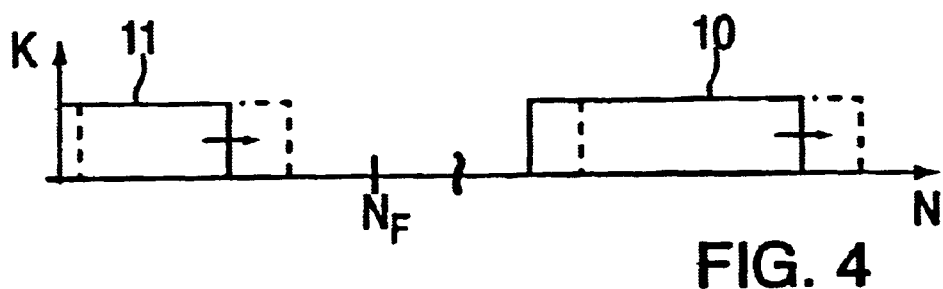
FIG. 4 shows a second graph of the amount of training data used in the cyclically repeated adjustment according to the present invention.

At the beginning of the startup of a system controlled by a neural network, many system parameters have to be changed to optimize the system. The suboptimum characteristics, however, should be dememorized by neural network 1 immediately after startup if possible. For such purpose, as shown in FIG. 4, it is provided that in initial learning phase 8, the steadily growing amount of training data is not used fully, but the oldest data points are successively dememorized. The rate of growth of the amount of training data 11 should, of course, be higher than the rate of dememorizing. The rate of dememorizing can be established in the form of a constant fraction of the growth rate of the training data amount 11, as a function of the difference between the initial parameters of the neural network and their correct values, or as a function of the expertise of the person responsible for the startup.

Figure 5:
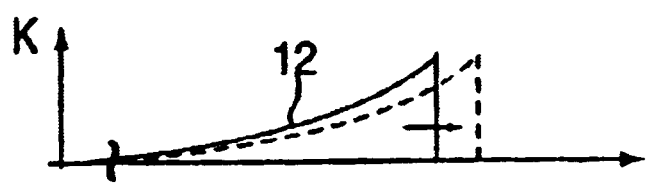
FIG. 5 shows a graph of the amount of training data when learning with exponential dememorizing.

FIG. 5 shows an example of an exponentially decreasing "natural" dememorizing function of a training data amount 12 created by weighting the data points in training data amount 12 with a factor that decreases as their age increases.

Figure 6:
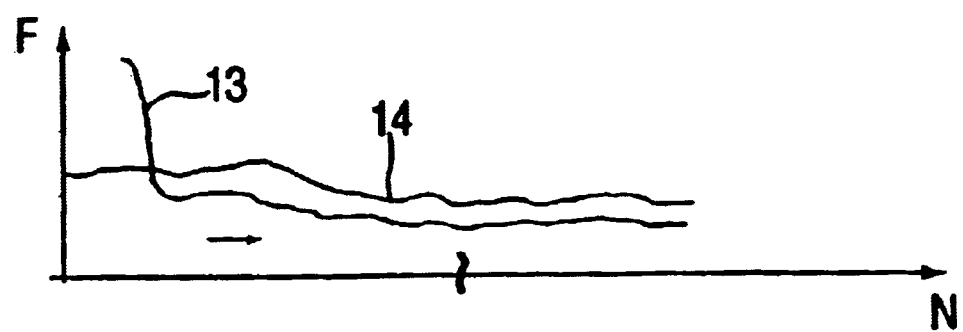
FIG. 6 shows a graph of typical error handling in the learning process according to the present invention compared to a reference learning procedure.

FIG. 6 shows the typical error handling 13 of residual error F of neural network 1 as a function of the number of data points N available in the learning procedure of the present invention in comparison with data handling 14 of a reference learning procedure, here a heredity file with an analytical model in a transient state.

FIG. 7 shows a neural network 16 which receives a plurality of input parameters combined into an input vector x, and which also generates a multidimensional response $y_{NN}$ as a function of this vector. The response $y_{NN}$ depends on adjustable parameters $p_1$ and/or $p_2$ of neural network 16. In the example shown, neural network 16 serves for modeling the relationship between the parameters, represented by input vector x, which influence an industrial process and a process parameter y, represented by response $y_{NN}$. An example of this is the prediction of the rolling force in a rolling process as a function of material-specific and system-specific parameters, such as the rolled stock temperature, rolled stock strength, rolled stock thickness, and thickness reduction.

To learn the relationship to be modeled and to adjust neural network 16 to the actual process, parameters $p_1$ and/or $p_2$ of neural network 16 are modified with the help of adjustment algorithms 17 and 18 to reduce the error between the response $y_{NN}$ delivered by neural network 16 and the actual process parameter y.

Accordingly, on-line adjustment takes place after each nth ($n \geq 1$) process run, i.e., after each rolled stock pass, with the help of adjustment algorithm 17 by forwarding the measured and recalculated parameters $x_{nach}$ to neural network 16 and comparing the resulting response $y_{NN}$ with the also measured or recalculated process parameter y. Non-plausible values or measurement errors are rejected by the recalculation.

Depending on the resulting error $y-y_{NN}$, selected parameters $p_1$ of neural network 16 are changed to reduce the error. Non-critical parameters $p_1$ and such adjustment algorithms are selected that ensure stability of the on-line adjustment and allow sudden changes in the process conditions to be followed.

The input parameters of input vector x, obtained after every nth rolled stock pass, together with the measured or recalculated process parameter y, serving as a reference for comparison with the response $y_{NN}$, form a data point that is stored in a storage device 19. The neural network 16 is trained in cyclic intervals on the basis of the training data set built from several stored data points, by clustering, selecting, or averaging with parameters $p_1$ $p_2$ of neural network 16 being modified adaptively with an adjustment algorithm 8. Parameters $p_1$ and $p_2$ can be the same, somewhat different or entirely different from one another. If the cyclically repeated training is performed as background training, the training data set used can be as large as desired and the optimizing learning algorithm can be a time-consuming global optimization algorithm.

After the completion of the background training, neural network 16 is initially subjected to an on-line adjustment with at least a portion of the data points serving as a basis for the training data set prior to activating neural network 16 again for controlling the system and continuing its on-line training with new data points. Thus, it is ensured that the neural network 16 immediately adjusts itself to the current format of the system to be controlled after the global background training.

What is claimed is:

1. A method for controlling an industrial process using a neural network, the industrial process having at least one time-variable parameter, the neural network including a control neural network and a background neural network, the method comprising the steps of:

training the control neural network using current process data to generate a current process model over a first predetermined time period;

training the background neural network using representative process data to generate an averaged process model of the industrial process over a second predetermined time period, the representative process data being different than the current process data, the second predetermined time period being longer than the first predetermined time period;

determining a parameter of the at least one time-variable parameter of the industrial process using the current process model; and controlling the industrial process as a function of the determined parameter;

wherein at least some of i) the current process data, or ii) the representative process data, are successively forgotten.

2. A method for controlling an industrial process using a neural network, the industrial process having at least one time-variable parameter, the neural network including a control neural network and a background neural network, the method comprising the steps of:

training the control neural network using current process data to generate a current process model;

training the background neural network using representative process data to generate an averaged process model of the industrial process over a predetermined time period, the representative process data being different than the current process data;

determining a parameter of the at least one time-variable parameter of the industrial process using the current process model;

controlling the industrial process as a function of the determined parameter; and replacing the control network with the background network after one of a predetermined training period and an occurrence of an external event.

3. The method of claim 2, wherein the step of training the background neural network is subdivided into an initial phase and an operating learning phase, wherein the background neural network is trained using training data, the training data growing in the initial phase and remaining substantially constant during the operating learning phase, and wherein the training data is provided to the background neural network in the initial phase resulting in a growth of the background neural network.

4. The method according to claim 2, wherein the predetermined time period is adjusted as a function of an at least one predetermined time constant value of the at least one time-variable parameters.

5. The method according to claim 2, wherein the background neural network includes a plurality of background neural networks, and wherein the step of training the plurality of background neural networks is performed simultaneously with a time shift between a first neural network of the plurality of background neural networks and a second neural network of the plurality of background neural networks.

6. The method according to claim 2, further comprising the step of:

checking the background neural network for plausibility before the control neural network is replaced with the background neural network.

7. The method according to claim 6, wherein the background neural network is checked for the plausibility by one of a running through a test data set and using the background neural network in parallel with the control neural network, wherein a first output of the background neural network is compared to a second output of the control neural network, and wherein the background neural network is determined as being plausible if a difference between the first output and the second output is below a predetermined tolerance level.

8. The method according to claim 2, wherein the training of the background neural network is performed using current process data before replacing the control neural network, the background neural network being minimally trained for adjusting the background neural network to a format of the industrial process.

9. The method according to claim 1, wherein the training step of the neural network is subdivided into an initial phase and an operating learning phase, wherein the training step is performed using training data, and wherein a size of the training data grows in the initial phase and remains substantially constant in the operating learning phase.

10. The method according to claim 9, wherein the neural network grows during the learning phase by introducing individual nodes and removing individual nodes having a weight less than a predetermined threshold.

11. The method according to claim 1, wherein the training step of the neural network is performed using training data, the training data having a varying amount of training data, and wherein a size of the neural network is adjusted to conform to the amount of training data.

12. The method according to claim 1, wherein the training step of the neural network is subdivided into an initial phase and an operating learning phase, wherein the control network is trained using training data, a size of the training data growing in the initial phase and remaining substantially constant during the operating learning phase, and wherein the training data is provided to the neural network in the initial phase to increase a size of the neural network.

13. A method for controlling an industrial process using a neural network, the industrial process having at least one time-variable parameter, the neural network including a control neural network and a background neural network, the method comprising the steps of:

training the control neural network using current process data to generate a current process model over a first predetermined time period;

training the background neural network using representative process data to generate an averaged process model of the industrial process over a second predetermined time period, the representative process data being different than the current process data, the second predetermine time period being longer than the first predetermined time period;

determining a parameter of the at least one time-variable parameter of the industrial process using the current process model;

controlling the industrial process as a function of the determined parameter; and replacing the control network with the background network after one of a predetermined training period and an occurrence of an external event;

wherein at least some of i) the current process data, or ii) the representative process data, are successively forgotten.

* * * * *